(12) United States Patent
Chang et al.

(10) Patent No.: US 9,904,643 B2
(45) Date of Patent: Feb. 27, 2018

(54) ELECTRONIC SYSTEM AND METHOD OF SWITCHING OPERATING SYSTEMS THEREOF

(71) Applicant: ASUSTeK COMPUTER INC., Taipei (TW)

(72) Inventors: Chien-CHih Chang, Taipei (TW); Tsung-Lin Li, Taipei (TW); Ying-Hao Chiu, Taipei (TW); Bi-Ling Hsueh, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 181 days.

(21) Appl. No.: 14/985,441

(22) Filed: Dec. 31, 2015

(65) Prior Publication Data

US 2016/0203095 A1    Jul. 14, 2016

(30) Foreign Application Priority Data

Jan. 12, 2015   (CN) .......................... 2015 1 0013447

(51) Int. Cl.
   *G06F 13/00*     (2006.01)
   *G06F 15/177*    (2006.01)
   (Continued)

(52) U.S. Cl.
   CPC ...... *G06F 13/4022* (2013.01); *G06F 13/4221* (2013.01)

(58) Field of Classification Search
   CPC ..... G06F 9/441; G06F 9/45558; G06F 9/4406
   (Continued)

(56) References Cited

U.S. PATENT DOCUMENTS 5,347,165 A    9/1994  Miyazono
8,205,069 B2   6/2012  Wu et al.
                (Continued)

FOREIGN PATENT DOCUMENTS

CN    103049071    4/2013
TW    200943180    10/2009

*Primary Examiner* — Faisal M Zaman
(74) *Attorney, Agent, or Firm* — JCIPRNET

(57) ABSTRACT

An electronic system including a first electronic device and a second electronic device and a method of switching operating systems thereof are provided. The first electronic device executes a first operating system. The second electronic device executes a second operating system. The operating system switch unit of the first electronic device includes an input and output switch unit and a logic determining circuit unit. The logic determining circuit unit determines whether the second electronic device is connected to the first electronic device to generate the connection information and determines whether to receive switch information which is generated by enabling a switch. The input and output switch unit determines to provide the control right of the peripheral input and output device of the first electronic device to the first electronic device or the second electronic device according to the connection information and the switch information, and the first operating system and the second operating system is selectively executed accordingly. As a result, the operating system of multiple electronic devices, respectively, can be freely switched to be executed at one of the electronic devices via the peripheral input and output device of one of the electronic devices.

5 Claims, 5 Drawing Sheets

(51) Int. Cl.
  *G06F 9/00*    (2006.01)
  *G06F 9/24*    (2006.01)
  *G06F 1/24*    (2006.01)
  *G06F 13/40*   (2006.01)
  *G06F 13/42*   (2006.01)

(58) Field of Classification Search
  USPC .................. 710/316, 303; 713/1, 2, 100
  See application file for complete search history.

(56) References Cited

U.S. PATENT DOCUMENTS

| | | | |
|---|---|---|---|
| 8,924,702 B2* | 12/2014 | Shen | G06F 9/441 |
| | | | 713/1 |
| 2009/0111517 A1* | 4/2009 | Chen | H04M 1/72522 |
| | | | 455/556.2 |
| 2011/0004749 A1* | 1/2011 | Bennetts | G06F 1/3203 |
| | | | 713/100 |
| 2013/0227270 A1* | 8/2013 | Ting | G06F 9/4411 |
| | | | 713/100 |
| 2013/0257763 A1* | 10/2013 | Lee | G06F 3/0412 |
| | | | 345/173 |
| 2014/0122749 A1* | 5/2014 | Ting | G06F 13/385 |
| | | | 710/14 |
| 2014/0334086 A1* | 11/2014 | Chou | G06F 1/1679 |
| | | | 361/679.17 |
| 2014/0344704 A1* | 11/2014 | Huang | G06F 15/17306 |
| | | | 715/740 |
| 2015/0317185 A1* | 11/2015 | Wu | G06F 9/4843 |
| | | | 713/100 |

* cited by examiner

ELECTRONIC SYSTEM AND METHOD OF SWITCHING OPERATING SYSTEMS THEREOF

CROSS-REFERENCE TO RELATED APPLICATION

This application claims the priority benefit of Chinese application serial No. 201510013447.7, filed on Jan. 12, 2015. The entirety of the above-mentioned patent application is hereby incorporated by references herein and made a part of specification.

BACKGROUND OF THE INVENTION

Field of the Invention

The invention relates to an electronic system and, more particularly, relates to an electronic system with an operating system.

Description of the Related Art

With the development of electronic technology, small-sized portable electronic devices are innovated. The portable electronic device becomes popular, such as a personal digital assistant (PDA), a notebook, a netbook, a tablet computer, and a smart mobile phone.

Applications adapted for an electronic system combining a plurality of portable electronic devices are developed. However, if electronic devices have different operating systems, respectively, the applications cannot be switched between different portable electronic devices.

BRIEF SUMMARY OF THE INVENTION

An electronic system including a plurality of electronic devices and a method of switching operating systems thereof are provided, it allows users to switch between operating systems of multiple electronic devices, respectively, via a peripheral input and output device of one of the electronic devices.

According to a first aspect of the present disclosure, an electronic system comprises: a first electronic device, applied with a first operating system, the first electronic device includes a peripheral input and output device, a switch, and an operating system switch unit; a second electronic device selectively connected to the first electronic device, wherein the second electronic device is applied with a second operating system, wherein the operating system switch unit includes: an input and output switch unit; and a logic determining circuit unit, wherein the logic determining circuit unit determines whether the second electronic device is connected to the first electronic device to generate connection information accordingly, the logic determining circuit unit determines whether to receive switch information which is generated when the switch is enabled, the input and output switch unit determines to provide control right of the peripheral input and output device to the first electronic device or the second electronic device according to the connection information and the switch information, and the first operating system and the second operating system is executed accordingly.

Furthermore, according to a second aspect of the present disclosure, a method of switching operating systems between electronic devices, adapted to an electronic system including a first electronic device and a second electronic device, the method comprises: determining whether the first electronic device is connected to the second electronic device to generate connection information, wherein a first operating system is applied to the first electronic device, and a second operating system is applied the second electronic device; determining whether to receive switch information which is generated when a switch of the first electronic device is enabled; and determining to provide control right of an peripheral input and output device of the first electronic device to the first electronic device or the second electronic device according to the connection information and the switch information, and then selectively operating the first operating system or the second operating system.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1A:
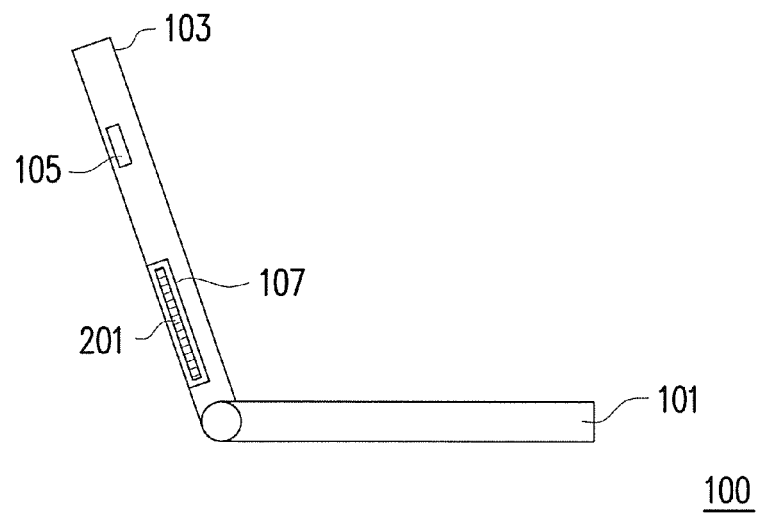
FIG. 1A shows a side view of a first electronic device in an embodiment.
Figure 1B:
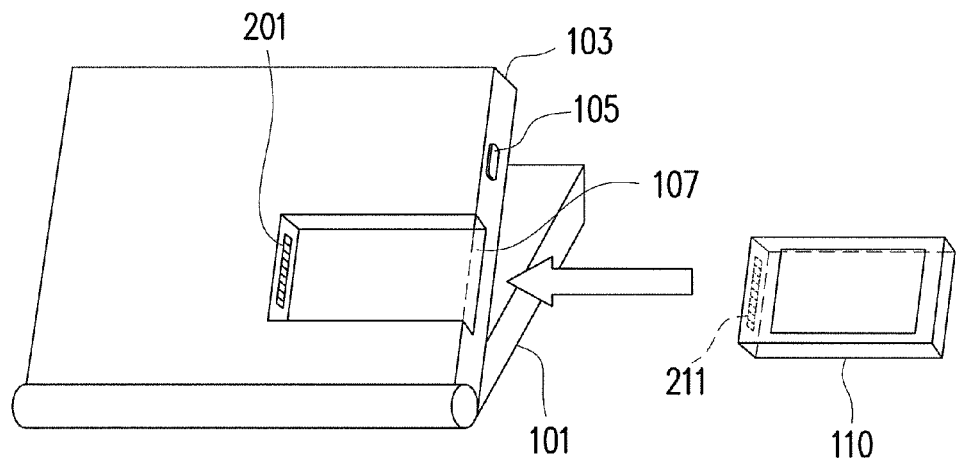
FIG. 1B is a schematic diagram showing that a second electronic device is combined with a first electronic device in an embodiment.

FIG. 1A shows a side view of a first electronic device in an embodiment. FIG. 1B is a schematic diagram showing that a second electronic device is combined with a first electronic device in an embodiment. Please refer to FIG. 1A and FIG. 1B, in an embodiment, a first electronic device 100 includes a host unit 101 and a display unit 103. A switch 105 and a slot 107 are formed at the display unit 103. In an embodiment, the first electronic device applied with a first operating system is a notebook, a tablet computer or a personal computer, which is not limited herein. In an embodiment, the second electronic device 110 applied with a second operating system is a mobile phone, a personal digital assistant (PDA), a tablet computer, or a vehicle navigation device, which is not limited herein. The second electronic device 110 is selectively connected to the first electronic device 100. As shown in FIG. 1B, the second electronic device 110 is selectively inserted into the slot 107 (as the arrow shown in FIG. 1B) of the first electronic device 100 to combine each other. The positions of the switch 105 and the slot 107 are not limited, such as at the display unit 103, or at any positions of the first electronic device 100 according to requirements.

In an embodiment, a first connecting port 201 is formed at the slot 107. When the second electronic device 110 is inserted to the slot 107, a second connecting port 211 of the second electronic device 110 is electronically connected to the first connecting port 201 of the first electronic device 100 to communicate with each other. In an embodiment, the second electronic device 110 is charged via the first connecting port 201.

Figure 2:
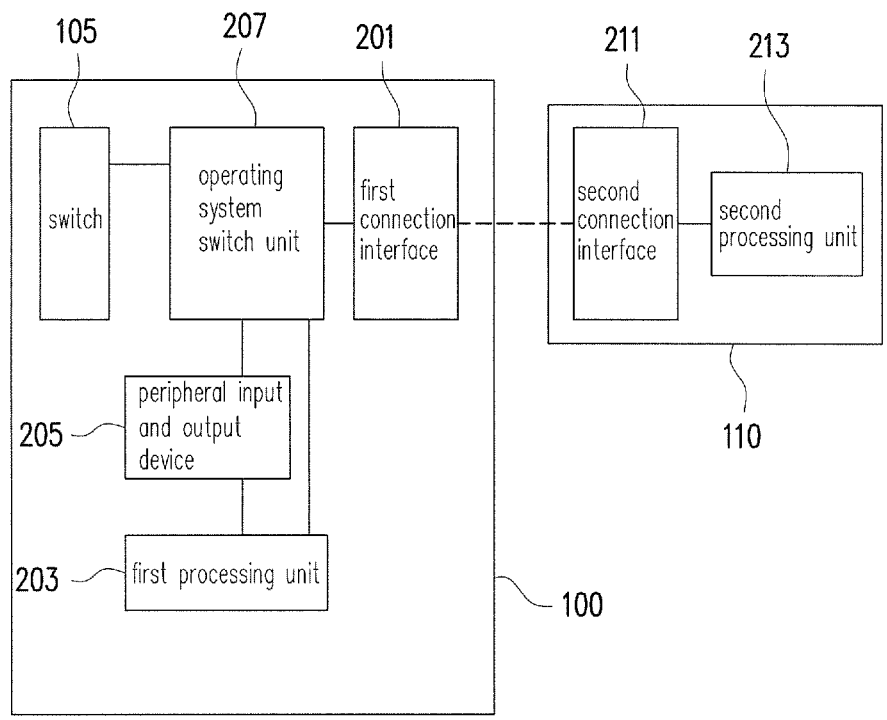
FIG. 2 is a block diagram showing an electronic system in an embodiment.

FIG. 2 is a block diagram showing an electronic system in an embodiment. In the embodiment, the electronic system includes a first electronic device 100 and a second electronic device 110. The first electronic device 100 includes the first connecting port 201, a first processing unit 203, a peripheral input and output device 205, a switch 105 and an operating system switch unit 207.

The first processing unit 203 executes the first operating system, and the first processing unit 203 is connected to the peripheral input and output device 205. The operating system switch unit 207 is connected to the peripheral input and output device 205, the first connecting port 201, the first processing unit 203 and the switch 105. The operating system switch unit 207 manages and controls switch operations of the operating system.

The second electronic device 110 executes the second operating system. The second electronic device 110 includes a second connecting port 211 and a second processing unit 213 connected to each other. The kind of the first operating system and the second operating system is not limited herein.

In an embodiment, the operating system applied in the first electronic device 100 or the second electronic device 110 is a Windows system, an iOS system, or an Android system. In an embodiment, the operating system applied in the first electronic device 100 and that applied in the second operating system is different.

The first processing unit 203 and the second processing unit 213 both has computing ability (such as a chipset and a processor) to control the operations of the first electronic device 100 and the second electronic device 110. In the embodiment, the first processing unit 203 is a central processing unit (CPU), a microprocessor, a digital signal processor (DSP), a programmable controller, an application specific integrated circuits (ASIC), a programmable logic device (PLD), which is not limited herein.

In the embodiment, the first connecting port 201 and the second connecting port 211 are physical ports to connect the first electronic device 100 or the second electronic device 110 to other electronic devices. After the connection is established, signals and data can be exchanged between the electronic devices. In the embodiment, the first connecting port 201 and the second connecting port 211 are physical ports complies to a universal serial bus (USB) interface standard or a personal computer memory card international association (PCMCIA) standard, which is not limited herein. In an embodiment, the type of the first connecting port 201 and the second connecting port 211, and the configuration of the first connecting port 201 and the second connecting port 211 (such as the number of the pin at the port and the function of the pin) is adjustable by manufacturers.

In the embodiment, the peripheral input and output device 205 includes a mouse, a keyboard, a scanner, a digital camera, a digiboard, a microphone, a touchpad, a touch control panel for inputting data or control the operating system, a screen, a loudspeaker, which is not limited herein.

The switch 105 is an electronic component which can make circuit open, make current interrupted or flow to other circuits. In an embodiment, the switch 105 is a spring type key with a spring configured therein, or a sensor type switch, such as a thermal induction type key, a light induction key, or a touch pad, and an electronic signal is generated when the sensor type switch is enabled. In an embodiment, the spring type key can be restored to the original state after pressed via the elastic force of the spring. The switch 105 includes an electronic contact. The electronic contact is conducted when the electronic contact is closed, and the current can flow through. Otherwise, when the electronic contact is open, the electronic contact is not conducted and current cannot flow through. In other words, when the switch 105 is pressed, the electronic contact is closed; when the switch 105 is not pressed, the spring is restored to the un-pressed state via the elastic force of the spring, and the electronic contact is open. As a result, the potential state of an end of electronic components connected to the switch 105 is controlled by pressing the switch 105.

In the embodiment, the first connecting port 201 is directly connected to the second connecting port 211. In an embodiment, the first connecting port 201 and the second connecting port 211 further includes wireless communication modules, respectively, and the first electronic device 100 is connected to the second electronic device 110 via the wireless connection.

Figure 3:
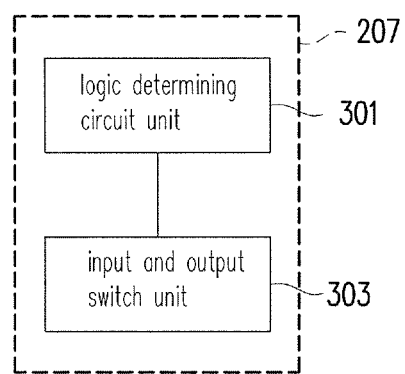
FIG. 3 is a block diagram showing an operating system switch unit in an embodiment.

FIG. 3 is a block diagram showing an operating system switch unit in an embodiment.

In FIG. 3, the operating system switch unit 207 includes a logic determining circuit unit 301 and an input and output switch unit 303.

The logic determining circuit unit 301 generates register data according to the connection information and switch information received from the switch 105. The register data indicates which operating system to be executed at the first electronic device 100 or which operating system currently operating at the first electronic device 100. For example, if the register data is first register data (the logic value of the first register data is "0"), that means, the first register data is used to set the first operating system to be executed at the first electronic device 100 or the current operating system at the first electronic device 100 is the first operating system. If the register data is the second register data (the logic value of the first register data is "1"), that means, the second register data is used to set the second operating system to be executed at the first electronic device 100 or the current operating system at the first electronic device 100 is the second operating system. The input and output switch unit 303 gets the register data generated from the logic determining circuit unit 301 according to an interrupt request (IRQ) of the logic determining circuit unit 301, and the input and output switch unit 303 determines that the operating system to be executed at the first electronic device 100 is the first operating system or the second operating system according to the register data. When the input and output switch unit 303 determines that the operating system corresponding to the register data is not the current operating system at the first electronic device 100, the input and output switch unit 303 switches the operating system to another one at the first electronic device 100.

For example, when the current operating system at the first electronic device 100 is the first operating system and the register data indicates that the operating system to be executed at the first electronic device 100 is the second operating system, the input and output switch unit 303 indicates the first processing unit 203 to shut down the first operating system or make the first operating system hibernated. In addition, the input and output switch unit 303 transmits a control signal or data from the peripheral input and output device 205 of the first electronic device 100 to the second electronic device 110 via connecting the first connecting port 201 and the second connecting port 211. At the time, the input and output switch unit 303 indicates the second processing unit 213 to utilize the peripheral input and output device 205 to execute the second operating system, then, the second processing unit 213 transmits data corresponding to the second operating system (such as display image data or audio data) to the peripheral input and output device 205 to output (for example, the peripheral input and output device 205 displays images or plays sound), or data (or instructions) is transmitted to the second operating system via the peripheral input and output device 205. As a result, the operating system operating at the first electronic device 100 is switched from the first operating system to the second operating system.

In contrast, if the current operating system at the first electronic device 100 is the second operating system and the register data indicates that the operating system to be executed at the first electronic device 100 is the first operating system, the input and output switch unit 303 indicates the first processing unit 203 to enable the first operating system. In addition, the input and output switch unit 303 notice the second processing unit 213 that the operating system to be executed at the first electronic device 100 is the first operating system, and then the second processing unit 213 does not transmit data corresponding to the second operating system (such as image data or audio data) to the first electronic device 100. Then, the operating system operated at the first electronic device 100 is switched from the second operating system to the first operating system.

Figure 4:
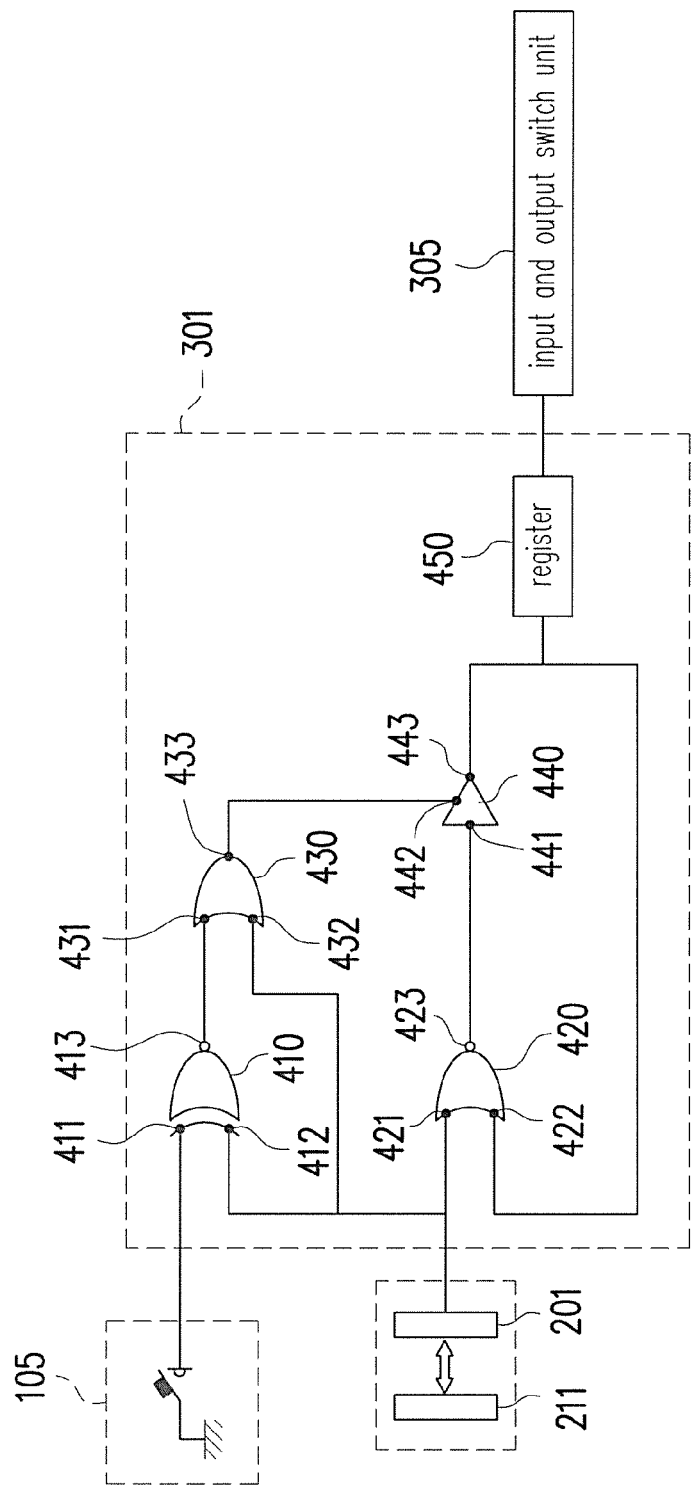
FIG. 4 is a schematic diagram showing a logic determining circuit unit in an embodiment.

FIG. 4 is a schematic diagram showing a logic determining circuit unit in an embodiment. In FIG. 4, the logic determining circuit unit 301 includes a XNOR gate 410, a NOR gate 420, an OR gate 430, a switch unit 440 and a register 450.

The XNOR gate 410 includes a first input end 411, a second input end 412 and an output end 413, the first input end 411 of the XNOR gate 410 is connected to the switch 105, and the second input end 412 of the XNOR gate 410 is connected to the first connecting port 201. The NOR gate 420 includes a first input end 421, a second input end 422 and an output end 423. The first input end 421 of the NOR gate 420 is connected to the first connecting port 201. The OR gate 430 includes a first input end 431, a second input end 432, and an output end 433. The first input end of the OR gate 430 is connected to the output end of the XNOR gate 410, and the second input end 432 of the OR gate 430 is connected to the first connecting port 201.

The switch unit 440 includes a first input end 441, a control end 442 and an output end 443. The control end 442 of the switch unit 440 is connected to the output end 433 of the OR gate 430, and the first input end 441 of the switch unit 440 is connected to the output end 423 of the NOR gate 420. In an embodiment, the switch unit 440 is a switch circuit component, such as a tri-state buffer, which is not limited herein. When the control end 442 of the switch unit 440 receives an electronic signal with a low voltage level (the logic value is "0"), that is, the control end 442 of the switch unit 440 is at a low voltage level, the switch unit 440 has high impedance. When the control end 442 of the switch unit 440 receives an electronic signal with a high voltage level (the logic value is "1"), that is, the control end 442 of the switch unit 440 is at a high voltage level, the switch unit 440 determines the electronic signal output from the output end 443 of the switch unit 440 according to the voltage of the electronic signal at the first input end 441 of the switch unit 440. For example, when the electronic signal received at the control end 442 of the switch unit 440 is at a high level (the logic value is "1") and the electronic signal received at the first input end 441 of the switch unit 440 is at a high voltage level, the switch unit 440 outputs an electronic signal at a high voltage level. When the electronic signal received at the control end 442 of the switch unit 440 is at a high level (the logic value is "1") and the electronic signal received at the first input end 441 of the switch unit 440 is at a low voltage level, the switch unit 440 outputs an electronic signal at a low voltage level.

The register 450 is coupled to the output end 443 of the switch unit 440, the second input end 422 of the NOR gate 420 and the input and output switch unit 305. The register 450 stores the register data. The logic determining circuit unit 301 determines that the operating system currently operating at the first electronic device 100 is the first operating system or the second operating system. The input and output switch unit 305 switches the first operating system or the second operating system to be executed at the first electronic device 100 according to the register data stored at the register 450.

The register data pre-stored at the register 450 indicates that the operating system operating at the first electronic device 100 is the first operating system. That is, when the second electronic device 110 is just connected to the first electronic device 100, the operating system operated at the first electronic device 100 is the first operating system until the register data changes. In another embodiment, the operating system switch unit presets that the operating system at the first electronic device 100 is switched to the second operating system when the second electronic device 110 is just connected to the first electronic device 100 until the register data changes. In an embodiment, the register 450 is stored in a memory in a program language, and the register 450 stores the logic value of the register data.

In the embodiment, when the first connecting port 201 is connected to the second connecting port 211, the logic determining circuit unit 301 generates first connection information (the logic value of the first connection information is "0"). When the first connecting port 201 is not connected to the second connecting port 211, the logic determining circuit unit 301 generates second connection information (the logic value of the first connection information is "1"). When the switch 105 is enabled, the switch 105 transmits the first switch information (the logic value of the first switch information is "0") to the logic determining circuit unit 301. When the switch 105 is not enabled, the switch 105 transmits the second switch information (the logic value of the first switch information is "1") to the logic determining circuit unit 301. The logic determining circuit unit 301 generates new register data (which is also called as another register data) according to the connection information, the switch information and the register data currently stored in the register 450, and the another register data is stored to the register 450 to replace the original register data in the register 450. If the switch 105 is not enabled and the connection information is the first connection information, the current logic determining circuit unit 301 would not generates the another register data, and the register data originally stored in the register 450 is maintained. As a result, if the switch 105 is not enabled, the operating system switch unit 207 would not alter the operating system, that is, the operating system switch unit 207 maintains the operating system that currently operated at the first electronic device 100.

In the embodiment, if the first connecting port 201 is not connected to the second connecting port 211, the logic determining circuit unit 301 generates the second connection information and the first register data and makes the first register data stored to the register. At the moment, the first operating system executes at the first electronic device 100. In this condition, regardless whether the switch 105 is enabled, the operating system operated at the first electronic device 100 is maintained.

According to the logic determining circuit unit 301 in the embodiment, the configuration of the logic determining circuit unit 301 can be changed accordingly to switch the operating system operated at the first electronic device 100 according to the connection information, the switch information, and information (such as the register data stored in the register 450) of the operating system operated at the first electronic device 100.

In the embodiment, the operating system switch unit 207 generates register data according to the connection information and the switch information, and the operating system switch unit 207 determines whether to give the control right of the peripheral input and output device 205 of the first electronic device 100 to the first electronic device 100 or the second electronic device 110 according to the register data stored in the register 450, and then the first operating system or the second operating system is selectively executed. In an embodiment, the operating system currently operated at the first electronic device 100 is the first operating system. The second connecting port 211 of the second electronic device 110 is connected to the first connecting port 201 of the first electronic device 100, and the operating system switch unit 207 generates the first connection information. Then, the operating system switch unit 207 detects that the operating system currently operated at the first electronic device 100 is the first operating system or the second operating system.

If the operating system switch unit 207 detects that the first operating system currently operated at the first electronic device 100, the operating system switch unit 207 further determines whether the switch information generated by enabling the switch is received. When the user enables the switch 105, the switch 105 transmits the first switch information to the operating system switch unit 207. Since the operating system currently operated at the first electronic device 100 is the first operating system, the operating system switch unit 207 switches the operating system to provide the control right of the peripheral input and output device 205 of the first electronic device 100 to the second electronic device 110 according to the received first switch information and the first connection information, and then the second operating system is executed at the first electronic device 100.

In an embodiment, when the second operating system is currently operated at the first electronic device 100, the operating system switch unit 207 further determines whether the switch information generated by enabling the switch is received. When the user enables the switch 105, the switch 105 transmits the first switch information to the operating system switch unit 207. Since the operating system currently operated at the first electronic device 100 is the second operating system, the operating system switch unit 207 switches the operating system to provide the control right of the peripheral input and output device 205 of the first electronic device 100 to the first electronic device 110 according to the first switch information and the first connection information, and then the first operating system is executed at the first electronic device 100.

In the above embodiment, if the operating system switch unit 207 receives the first switch information, the first connection information, and determines the operating system currently executed at the first electronic device 100 is the first operating system, the operating system switch unit 207 indicates the first processing unit 203 to make the first operating system shut off or sleep, and the operating system switch unit 207 generates a control command to the second processing unit 213 via the second connecting port 211. The control command indicates the second processing unit 213 to transmit the display image data of the second operating system and/or video data of the second operating system to the first electronic device 100, and the control command indicates the second processing unit 213 to receive the control signal from the first electronic device 100.

Then, the operating system switch unit 207 transmits the control signal of the first electronic device 100 to the second processing unit 213 via the first connecting port 201 and the second connecting port 211. For example, the control signal generated by operating a keyboard or a mouse is transmitted to the second processing unit 213. At the same time, the operating system switch unit 207 receives the display image data and video data of the second operating system to display and play at the first electronic device 100, respectively. For example, the frame of the second operating system is displayed at the display of the first electronic device 100 and the sound of the second operating system is played from a loudspeaker of the first electronic device 100. As a result, the second operating system of the second electronic device 110 is executed by operating the peripheral input and output device 205 of the first electronic device 100 to control the second electronic device 110. For example, data is input from a keyboard of the first electronic device 100 to a calendar application of the second operating system of the second electronic device 110. At the same time, data which is input to the calendar application of the second operating system and the frame of the second operating system of the second electronic device 110 are shown at the display of the first electronic device 100. In the above embodiment, the second electronic device 110 can be executed by switching to the second operating system as the operation of at the first electronic device 100. In other words, the peripheral input and output device 205 of the first electronic device 100 can be used to execute the second electronic device 110.

In the embodiment, when the operating system switch unit 207 determines that the first connecting port 201 is not connected to the second connecting port 211 (for example, the second electronic device 110 is detached from the first electronic device 100) and the second operating system is currently executed at the first electronic device 100, the operating system switch unit 207 generates the second connection information, and the operating system switch unit 207 automatically switches to the first operating system to at the first electronic device 100. In an embodiment, when the second operating system is executed at the first electronic device 100, if the operating system switch unit 207 detects that the second electronic device 110 is abnormal or the feedback from the second electronic device 110 cannot be received, the operating system switch unit 207 automatically switches to the first operating system executed at the first electronic device 100.

Figure 5:
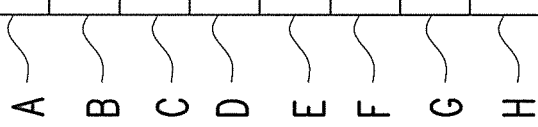
FIG. 5 is a truth table corresponding to a logic determining circuit unit in an embodiment.

FIG. 5 is a truth table corresponding to a logic determining circuit unit in an embodiment. As shown in FIG. 5, a truth table 500 includes eight situations (situation A to situation H) determined by the logic determining circuit unit 301. At each of the situations, another register data (as shown underlined in FIG. 5) is generated according to the connection information, the register data and the switch information corresponding to the situation.

For example, in situation A, the connection information is the first connection information (the first connecting port 201 is connected to the second connecting port 211), the register data is the first register data (the first operating system is currently executed at the first electronic device 100), and the switch information is the first switch information (the switch 105 is enabled). In the situation A, the logic determining circuit unit 301 generates another register data, and the another register data is the second register data (which indicates that the second operating system will be executed at the first electronic device 100). In situation B, the connection information is the first connection information (the first connecting port 201 is connected to the second connecting port 211), the register data is the first register data (the operating system is operated at the first electronic device 100 is the first operating system), and the switch information is the second switch information (the switch 105 is not enabled). In situation B, the logic determining circuit unit 301 maintains (another register data is not generated) the first register data (which indicates that the first operating system is to be executed at the first electronic device 100) at the register 450. Similarly, in situation C, the logic determining circuit unit 301 generates another register data which is the first register data (which indicates the first operating system is to be executed at the first electronic device 100). In situation D, the logic determining circuit unit 301 maintains (which indicates that another register data is not generated) the second register data (which indicates the second operating system is to be executed at the first electronic device 100) at the register 450.

In situation E and situation F, the first electronic device 100 is not connected to the second electronic device 110. In situation G and situation H, the second electronic device 110 is detached from the first electronic device 100. In the situation E, situation F, situation G, and situation H (as shown in FIG. 5), since the connection information is the second connection information, the logic determining circuit unit 301 only generates another register data which is the first register data (which indicates that the first operating system to be executed at the first electronic device 100). In other words, in situation E and situation F, no matter whether the switch 105 is enabled, the operating system switch unit 207 maintains the first operating system at the first electronic device 100.

In situation G and situation H, no matter whether the switch 105 is enabled, the operating system switch unit 207 switches the operating system to the first operating system at the first electronic device 100. The truth table 500 just shows an embodiment for illustrate the logic determining circuit unit 301, which is not limited herein. The logic determining circuit unit has various types according to the embodiment, and the truth table is set corresponding to the logic determining circuit unit accordingly.

Figure 6:
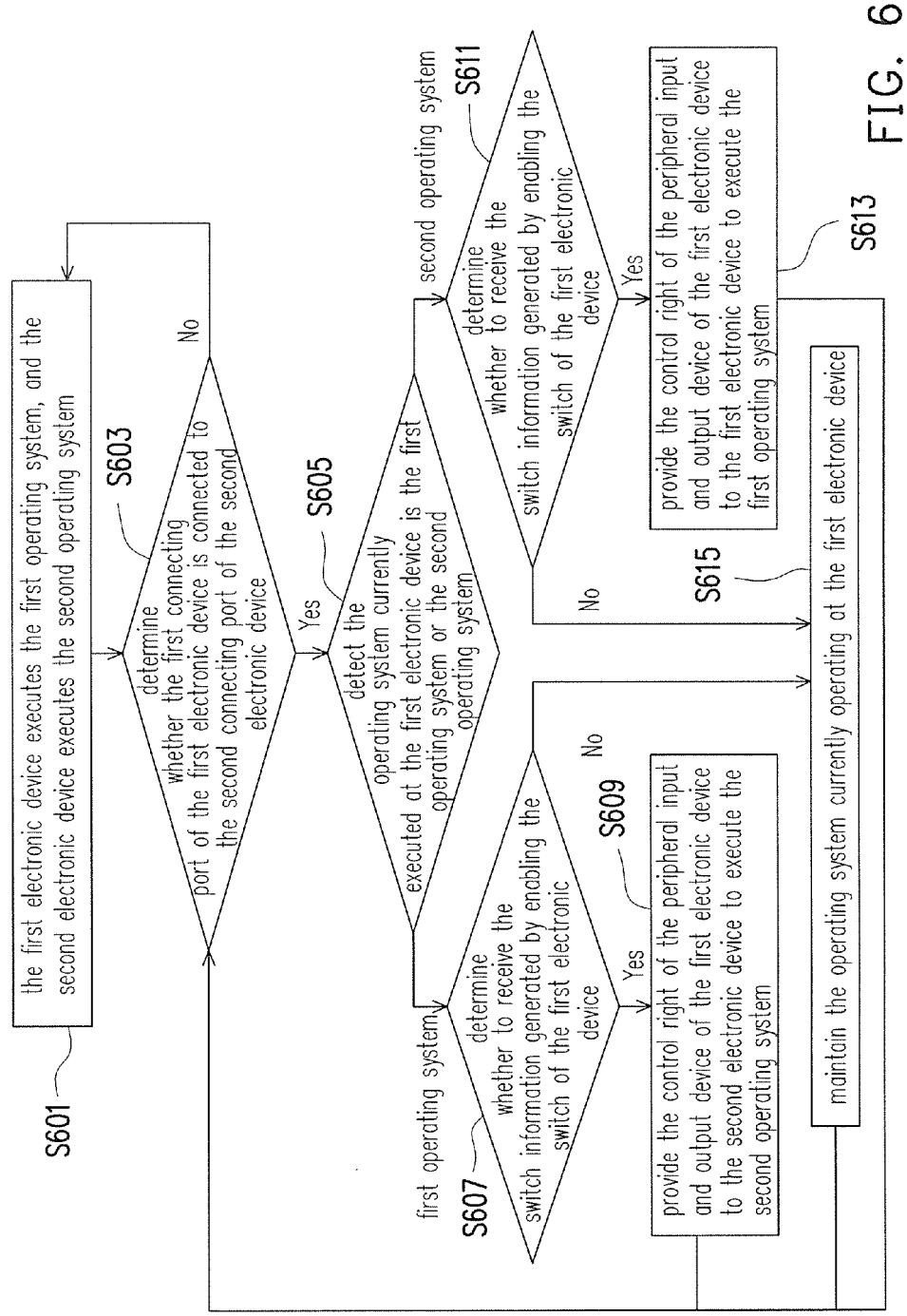
FIG. 6 is a flow chart showing a method of switching operating systems in an embodiment.

FIG. 6 is a flow chart showing a method of switching operating systems in an embodiment. As shown in FIG. 2 and FIG. 6, in step S601, the first electronic device 100 executes the first operating system, and the second electronic device 110 executes the second operating system. In step S603, the operating system switch unit 207 determines whether the first connecting port 201 of the first electronic device 100 is connected to the second connecting port 211 of the second electronic device 110.

In step S603, when the operating system switch unit 207 determines the first connecting port 201 of the first electronic device 100 is not connected to the second connecting port 211 of the second electronic device 110, the method back to step S601. In step S603, when the operating system switch unit 207 determines the first connecting port 201 of the first electronic device 100 is connected to the second connecting port 211 of the second electronic device 110, the method goes to step S605 from step S603, the operating system switch unit 207 detects the operating system currently executed at the first electronic device is the first operating system or the second operating system.

In step S605, if the operating system switch unit 207 detects that the first operating system is currently executed at the first electronic device, the method goes to step S607 from step S605, the operating system switch unit 207 determines whether to receive the switch information which is generated by enabling the switch 105 of the first electronic device 100. If the operating system switch unit 207 receives the switch information which is generated by enabling the switch 105 of the first electronic device 100, the method goes to step S609 from step S607, the operating system switch unit 207 provides the control right of the peripheral input and output device 205 of the first electronic device 100 to the second electronic device 100 to execute the second operating system and then the method back to step S603. If the operating system switch unit 207 does not receive the switch information which is generated by enabling the switch 105 of the first electronic device 100, the method goes to step 615 from step S607, the operating system switch unit 207 maintains the operating system currently operating at the first electronic device 100 and the method back to step S603.

In step S605, if the operating system switch unit 207 detects that the second operating system is currently executed at the first electronic device, the method goes to step S611 from step S605, the operating system switch unit 207 determines whether to receive the switch information which is generated by enabling the switch 105 of the first electronic device 100. If the operating system switch unit 207 receives the switch information which is generated by enabling the switch 105 of the first electronic device 100, the method goes to step S613 from step S611, the operating system switch unit 207 provides the control right of the peripheral input and output device 205 of the first electronic device 100 to the first electronic device 100 to execute the first operating system, and the method goes back to step S603. If the operating system switch unit 207 does not receive the switch information which is generated by enabling the switch 105 of the first electronic device 100, the method goes to step S615 from step S611, the operating system switch unit 207 maintains the operating system currently operating at the first electronic device 100 and the method goes back to step S603.

In the embodiment, the operating system switch unit 207 is a hardware circuit, which is not limited herein. In an embodiment, the operating system switch unit 207 is program codes or software for switching the operating system. For example, the operating system switch unit 207 is an operating system switch module which is formed by a plurality of application instructions, and the operating system switch unit 207 includes a logic determining module and an input/output switch module. The operating system switch module is executed by the first processing unit 203 to complete the function of the operating system switch unit 207.

In sum, according to the electronic system in embodiments, after two portable electronic devices are connected, by enabling a switch of one of the portable electronic devices, the operating system operated at one of the portable electronic devices is switched between its operating system and the operating system executed at the connected portable electronic device. It is convenient to operate multiple portable electronic devices with different operating systems.

Although the invention has been disclosed with reference to certain preferred embodiments thereof, the disclosure is not for limiting the scope. Persons having ordinary skill in the art may make various modifications and changes without departing from the spirit and the scope of the invention.

Therefore, the scope of the appended claims should not be limited to the description of the preferred embodiments described above.

What is claimed is:

1. An electronic system, comprising:
   a first electronic device, applied with a first operating system, the first electronic device includes a peripheral input and output device, a switch, and an operating system switch unit;
   a second electronic device selectively connected to the first electronic device, wherein the second electronic device is applied with a second operating system,
   wherein the operating system switch unit includes:
      an input and output switch unit; and
      a logic determining circuit unit, wherein the logic determining circuit unit determines whether the second electronic device is connected to the first electronic device to generate connection information accordingly, the logic determining circuit unit determines whether to receive switch information which is generated when the switch is enabled, the input and output switch unit determines to provide control right of the peripheral input and output device to the first electronic device or the second electronic device according to the connection information and the switch information, and the first operating system and the second operating system is executed accordingly,
   wherein the logic determining circuit unit includes:
      a XNOR gate including a first input end, a second input and an output end, wherein the first input end of the XNOR gate is connected to the switch, the second input end of the XNOR gate is connected to the first electronic device, the first input end of the XNOR gate is used to receive the switch information, a second input end of the XNOR gate is used to receive the connection information;
      a NOR gate including a first input end, a second input and an output end, wherein the first input end of the NOR gate is connected to the first electronic device to receive the connection information;
      an OR gate including a first input end, a second input and output end, wherein the first input end of the OR gate is connected to the output end of the XNOR gate, and the second input end of the OR gate is connected to the first electronic device to receive the connection information;
      a switch unit, wherein the switch unit includes a first input end, a control end, and an output end, the control end of the switch unit is connected to the output end of the OR gate, the first input end of the switch unit is connected to the output end of the NOR gate; and
      a register, wherein the register is connected to the output end of the switch unit, the second input end of the NOR gate, and the input and output switch unit, and the register stores register data output from the switch unit.

2. The electronic system according to claim 1, wherein the first electronic device includes a first connecting port, and the second electronic device includes a second connecting port.

3. The electronic system according to claim 2, wherein the operating system switch unit detects whether the first connecting port is connected to the second connecting port;
   when the first connecting port is connected to the second connecting port, the operating system switch unit generates first connection info nation; and
   when the first connecting port is not connected to the second connecting port, the operating system switch unit generates second connection information.

4. The electronic system according to claim 3, wherein the operating system switch unit generates the first connection information, the operating system switch unit generates another register data according to the register data stored in the register;
   when the register data stored in the register is first register data and the operating system switch unit receives the switch information, the operating system switch unit generates second register data to provide the control right of the peripheral input and output device of the first electronic device to the second electronic device to execute the second operating system; and
   when the register data stored in the register is the second register data and the operating system switch unit receives the switch information, the operating system switch unit generates the first register data to provide the control right of the peripheral input and output device of the first electronic device to the first electronic device to execute the first operating system, the first register data represents that the operating system to be executed at the first electronic device is the first operating system, and the second register data represents that the operating system to be executed at the first electronic device is the second operating system.

5. The electronic system according to claim 3, wherein the connection information is the second connection information and the second operating system is currently executed on the first electronic device, the operating system switch unit automatically switch the control right of the peripheral input and output device of the first electronic device to the first electronic device to execute the first operating system.

* * * * *